Figure 1:
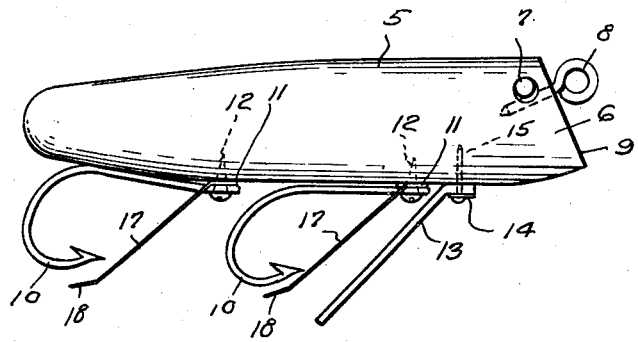

May 2, 1944.  H. J. KOERING  2,347,743

ARTIFICIAL WEEDLESS FISHING LURE

Filed Jan. 1, 1942

Inventor

Herman J. Koering

By Clarence A. O'Brien
and Harvey B. Jacobson
Attorneys

Patented May 2, 1944

2,347,743

UNITED STATES PATENT OFFICE 2,347,743

ARTIFICIAL WEEDLESS FISHING LURE

Herman J. Koering, Pierz, Minn.

Application January 1, 1942, Serial No. 425,315

2 Claims. (Cl. 43—46)

This invention appertains to new and useful improvements in fishing lures, the principal object of the invention being to provide a lure constructed in such a manner as to prevent weeds from entangling with the hook or hooks thereof.

Another important object of the invention is to provide a weed eleminator for fishing lures which may be applied conveniently to conventional lures.

Other objects and advantages of the invention will become apparent to the reader of the following description.

Figure 2:
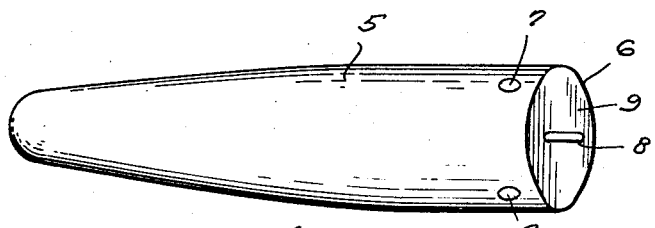
Figure 3:
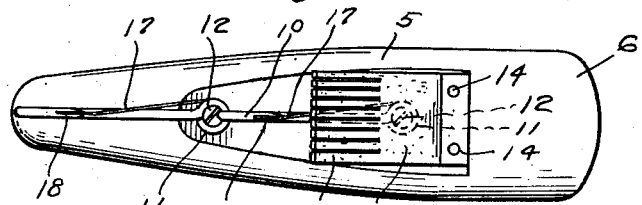
Figure 4:
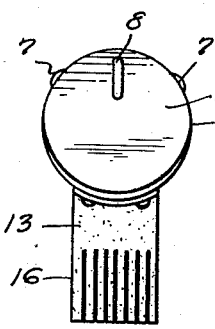

In the drawing:

Figure 1 represents a side elevational view.
Figure 2 is a top plan view.
Figure 3 is a bottom plan view.
Figure 4 is an end elevational view looking at the forward end.

Referring to the drawing wherein like numerals designate like parts, it can be seen that numeral 5 denotes a body structure of rearwardly tapering formation, having its rear end portion rounded off and this body is preferably of cylindrical cross section throughout its entire length.

The forward end of the body 5 is provided with a head formation 6, this head portion 6 having a pair of eye simulating elements 7 and also a forwardly projecting fishing line attaching eye 8. It is preferable that the head portion 6 be constructed to define a rearwardly sloping front face 9.

These hooks are denoted by numerals 10, 10 and each hook has an eye 11 through which an element 12 is disposed and driven into the underside of the body 5.

Just in front of the forward hook 10 is a weed guard in the form of a flexible flap 13. These flaps may be constructed of rubber. The upper portion of each of these flaps 13 is denoted by numeral 14 and is secured to the underside of the body 5 by a nail or like member 15.

Each of these flaps 13 is split on parallel lines, upwardly from its lower edge to substantially an intermediate point to define a plurality of narrow fingers 16.

Interposed between each flap 13 and its corresponding hook 10 is a wire member 17, the lower portion of which is disposed obliquely as at 18 under the corresponding hook while its upper portion is formed with an eye and secured in place against the body by the same securing element 12 which secures the corresponding hook 10 in place.

It can now be seen, that the guard flap 13 wipes against weeds and other foreign matter and causes a rising of the body 5 over the obstacles with the result that the hook does not foul on said foreign obstacles.

Obviously, when a fish strikes the bait, the guard 13 will readily give pass the hook along with the sustaining wire 17 with the result that this member will not interfere with the proper hooking of the fish.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A fishing lure comprising a body, a hook depending from the body, a flexible weed guard flap depending from the body in advance of the hook, and a member interposed between the flap and the hook to prevent fouling of the flap on the hook.

2. A fishing lure comprising a body, a hook depending from the body, a flexible weed guard flap depending from the body in advance of the hook, and a member interposed between the flap and the hook to prevent fouling of the flap on the hook, said body being provided with a head having a rearwardly sloping front face portion.

HERMAN J. KOERING.